United States Patent [19]
Easterling

[11] 4,405,252
[45] Sep. 20, 1983

[54] METHOD AND APPARATUS FOR VEHICLE DOOR ARM REST ANCHOR REPAIR

[76] Inventor: J. W. Easterling, 617 Mercury, Altus, Okla. 73521

[21] Appl. No.: 349,581

[22] Filed: Feb. 17, 1982

[51] Int. Cl.³ .......................... B25G 3/00; F16D 1/00; F16G 11/00
[52] U.S. Cl. .................................... 403/11; 29/402.01
[58] Field of Search .................. 403/11, 24, 376, 380; 29/402.1

[56] References Cited

U.S. PATENT DOCUMENTS 2,146,128 2/1939 Oldham .............................. 411/173
2,967,593 1/1961 Cushman ............................. 52/787

Primary Examiner—Wayne L. Shedd
Attorney, Agent, or Firm—Harvey B. Jacobson

[57] ABSTRACT

An elongated sleeve is provided and has a centrally apertured end wall secured over one end through which the shank portion of a headed and threaded fastener may be slidingly received. The other end of the sleeve is beveled sharply and includes a radial bore spaced slightly inwardly of the tip end thereof. The sleeve is snugly slidably receivable in the outer counterbore of a fastener receiving bore formed through one end of a vehicle door arm rest and is seated against the shoulder at the inner end of the counterbore. A first threaded fastener passes through the end wall of the sleeve and is threaded into the anchoring support for the arm rest and a second threaded fastener passes through the radial bore and is threaded into the body of the arm rest.

5 Claims, 4 Drawing Figures

U.S. Patent  Sep. 20, 1983  4,405,252
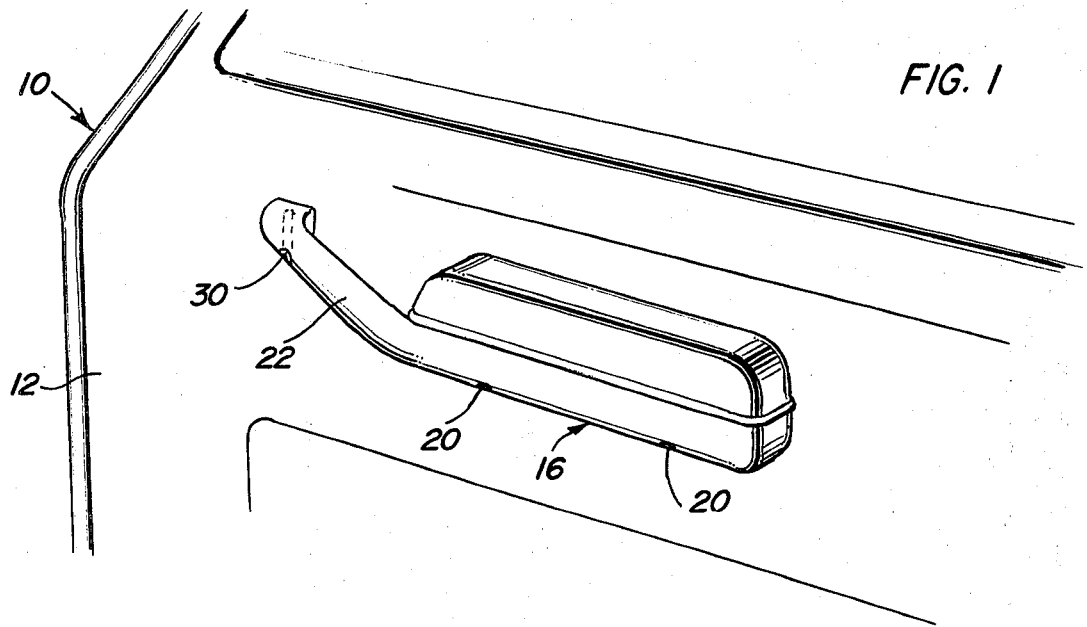
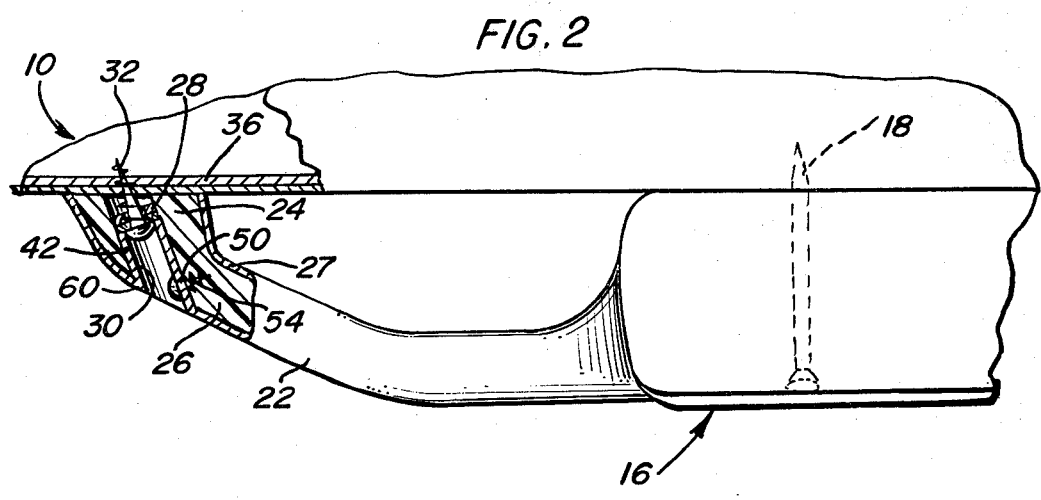
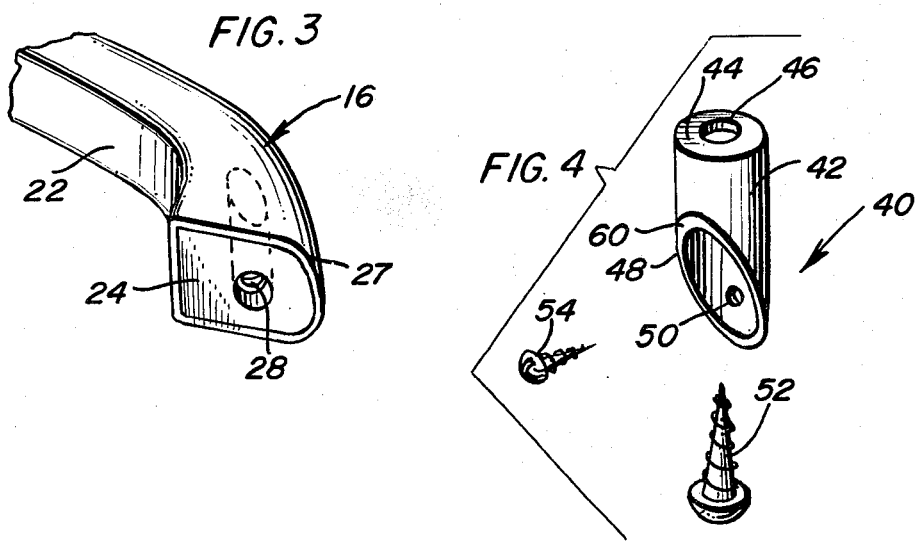

METHOD AND APPARATUS FOR VEHICLE DOOR ARM REST ANCHOR REPAIR

BACKGROUND OF THE INVENTION

Various makes of automobiles are equipped with arm rests mounted on the inner surfaces of the doors thereof and some of the arm rests include hand grip portions at one end thereof conventionally secured to the associated doors by single threaded fasteners secured through the arm rest ends and anchored in the corresponding doors. However, some of these hand grip portions are utilized on the doors of two-door vehicles (which doors are considerably longer from the hinged edges thereof to the free swinging edges thereof) and the ends of the arm rests disposed nearest the hinged edges thereof are subject to being torn from their securement to the associated door portions due to the fact that the mechanical leverage afforded by arm rest hand grip ends anchored to the associated doors only slighty spaced from the hinged marginal portions of the doors is minimal. Accordingly, these hand ends are frequently torn from their door attaching points and a need exists for an improved method of reattaching the arm rest hand grip ends to the associated doors. By providing an improved method of reattachment of the arm rest hand grip ends to the associated doors considerable expense represented by the total replacement of a door arm rest is avoided. Further, in many instances such arm rest repair and/or replacement is not required for three to five years, at which time the new arm rests may not be available from the manufacturer. Still further, although used arm rests may be obtained from junk yards, many such used arm rests have also been damaged in the subject areas of attachment to the associated doors. Accordingly, in many instances new replacement arm rests or good used replacement arm rests are not available.

Various attachment structures, spacers and grommet structures, including some of the general structural and operational features of the instant invention, are disclosed in U.S. Pat. Nos. 2,146,128, 2,700,172, 2,802,519, 2,967,593 and 3,264,031. However, these previously known structures are not adaptable to the arm rest anchor structure repair of the instant invention.

SUMMARY OF THE INVENTION

The arm rest anchor repair structure of the instant invention comprises merely a cylindrical sleeve having a centrally apertured end wall at one end and which is sharply beveled at its opposite end and provided with a radial fastener receiving bore spaced slightly from the tip end of the beveled end of the sleeve. A first threaded fastener may be secured through the centrally apertured end wall of the sleeve and a second threaded fastener may be secured through the radial bore.

The sleeve is receivable and seatable within the inner end of the counterbore of a fastener receiving bore existing in a conventional arm rest with the fastener secured through the end wall of the sleeve comprising a substitute for the original fastener and the fastener secured through the radial bore of the sleeve forming a secure anchor of the sleeve relative to the arm rest. Further, in addition to the structure of the instant invention, the method of repair of a broken arm rest is inherent in the instant invention.

The main object of this invention is to provide novel structure for repair of broken vehicle door arm rests attaching structure.

Another object of this invention is to provide a repair for a broken vehicle door arm rest attaching structure which will effect a stronger attachment of the arm rest to an associated vehicle door than the original attachment thereof provided by the manufacturer.

Yet another object of this invention is to provide a vehicle arm rest attachment repair structure incorporating structure enabling the desired repairs to be effected in a short time.

A final object of this invention to be specifically enumerated herein is to provide a vehicle door arm rest attachment structure repair apparatus and method in accordance with the preceding objects and which will conform to conventional forms of manufacture, be of simple construction and easy to use, so as to provide a device that will be economically feasible, long lasting and relatively trouble-free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of a typical vehicle front door illustrating the mounting position of the original equipment arm rest on the door and with the forward end of the arm rest spaced only slightly rearwardly of the hinged marginal edge portion of the door;

FIG. 2 is a fragmentary plan view of the arm rest and the adjacent door portion with the arm rest attachment structure repair effected and the repair structure and adjacent portions of the arm rest and vehicle door being illustrated in horizontal cross section;

FIG. 3 is a perspective view of the attachment end of the arm rest; and

FIG. 4 is an exploded perspective view of the repair structure.

DETAILED DESCRIPTION OF THE INVENTION

Referring now more specifically to FIG. 1, the numeral 10 generally designates a right front door of a two-door vehicle. The left end 12 of the door 10 constitutes the hinged marginal portion of the door and the remote end of the door constitutes the free swinging marginal edge portion thereof. The interior of the door 10 has an arm rest referred to in general by the reference numeral 16 mounted thereon through the utilization of fasteners 18 inserted into the counterbore equipped ends of a pair of fastener receiving bores 20 formed through the arm rest 16 and the fasteners 18 extend through the arm rest 16 and are threadedly engaged with structural portions of the door 10 against which the arm rest 16 is abutted. In addition, the forward end of the arm rest 16 includes a forwardly directed hand grip portion 22 including a free end 24. The hand grip portion 22 includes a plastic core 26 and an outer trim covering 27. The core 26 includes a fastener receiving bore 28 formed therethrough and one end of the bore 28 includes a counterbore 30 which opens outwardly of the inner side of the hand grip portion 22. Conventionally, a headed and threaded fastener 32 is seated against the shoulder defined at the inner end of the counterbore 30 with its threaded shank slidingly received through the bore 28 and threadedly engaged in the opposing structural member 36 of the door 10.

Inasmuch as the free end 24 is reasonably closely spaced relative to the hinged marginal portion of the door 10, when attempting to close the door 10 by utilization of the hand grip, excessive forces are placed upon the attachment of the forward free end 24 of the hand grip portion 22 to the door 10 by the fastener 32 with the result that the portion of the core 26 defining the shoulder at the inner end of the counterbore 30 may have parts thereof broken away, thus allowing the head of the fastener 32 to pull through the bore 28. Of course, reinstallation of the fastener 32 results in an even weaker attachment of the forward end 24 of the core 26 to the door 10 and usual repair of the hand grip attachment to the door is effected by replacement of the arm rest 16 either by a new arm rest or an unbroken used arm rest.

However, the repair structure of the instant invention and referred to in general by the reference numeral 40 may be utilized to effect repair of the attachment of the forward end 24 of the core 26 to the door 10. The repair structure 40 comprises a cylindrical sleeve 42 having an end wall 44 on one end provided with a central aperture 46. The other end of the sleeve is sharply beveled as at 48 and the tip end portion of the bevel includes a radial bore 50. A first fastener 52 is provided for securement through the aperture 46 and a second fastener 54 is provided for securement through the bore 50. Actually, if the original fastener 32 has not been lost, the fastener 32 may be used as an alternative to the fastener 52.

In order to effect repair of the free end 24 of the core 26, the original fastener 32 is removed and the sleeve 42 is inserted in the counterbore 30 in the manner illustrated in FIG. 2 of the drawings with the end wall 44 of the sleeve 42 seated against the shoulder defined at the inner end of the counterbore 30. Thereafter the fastener 32 or the fastener 52 may be secured through the aperture 46 and threaded into the structural member 36 of the door 10. Inasmuch as the sleeve is maintained stationary during tightening of the fastener 32 or the fastener 52, the clamping effect of the end wall 44 on any remaining portion of the shoulder defined at the inner end of the counterbore 30 is increased in effectiveness. In addition, the fastener 54 is subsequently secured into the core 26 through the bore 50 and provides additional anchoring of the sleeve 42 to the core 26. Accordingly, even if no portion of the shoulder defined at the inner end of the counterbore 30 remains, the repair structure 40 would be effective to anchor the free end 24 of the core 26 to the structural member 35 of the door 10. The fastener 32 or the fastener 52 would be operative to anchor the sleeve 42 to the structural member 36 and the fastener 54 would be operative to anchor the sleeve 42 to the core 26.

It has even been found that if the fastener 32 is lightly coated with oil or has teflon tape wrapped thereabout, a small quantity of epoxy-type adhesive may be applied to the free end 24 of the core 26 at the end of the bore 28 remote from the counterbore 30 in order to provide additional reinforcement to the shoulder against which the end wall 44 is abutted. However, the desired repair may be effected independent of the use of such epoxy adhesive. Further, it will be noted from FIGS. 2 and 4 of the drawings that the radial bore 50 is spaced along the sleeve 42 from the end wall 44 a distance greater than the spacing of the heel end 60 of the beveled end 48 from the end wall 44. Thus, ready access to the radial bore 50 may be had through the beveled side of the sleeve 42.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. For use with an article including a fastener receiving bore formed therethrough and wherein said bore includes an enlarged counterbore at one end extending inwardly of said one end of said bore, terminates inwardly only a slight distance from the other end of said bore and defines an axially thin shoulder of the material of which the adjacent portion of said articles is constructed surrounding said bore against which an article retaining head of a fastener secured through said bore may seat, a repair structure for use when said shoulder has been partially or fully broken away, said repair structure including a sleeve to be snugly received and seated in said counterbore and including an end wall on the end of the sleeve opposing the shoulder with the end wall including a central aperture formed therethrough, the end portion of said sleeve remote from said end wall being beveled, the beveled end of said sleeve including a generally radial bore spaced inwardly of the tip end thereof, a first fastener securable through said aperture and a second fastener securable through said bore.

2. The repair structure of claim 1 wherein said sleeve and end wall are constructed of metal.

3. The repair structure of claim 1 wherein said radial bore is spaced along said sleeve from said end wall a distance greater than the distance the heel portion of said beveled end is spaced from said end wall.

4. The repair structure of claim 1 wherein said fasteners comprise headed, threaded fasteners.

5. In combination with an article including a fastener receiving bore formed therethrough and wherein the bore includes an enlarged counterbore at one end extending inwardly of said one end of said bore, terminates inwardly only a slight distance from the other end of said bore and defines an axially thin shoulder of the material of which the adjacent portion of said article is constructed surrounding said bore against which an article retaining head of a fastener secured through said bore may seat, a repair structure for use when said shoulder has been partially or fully broken away, said repair structure including a sleeve snugly received and seated in said counterbore and including an end wall on the end of said sleeve opposing said shoulder, said end wall including a central aperture formed therethrough, the end portion of said sleeve remote from said end wall being beveled, said beveled end of said sleeve including a generally radial bore spaced inwardly of the tip end thereof, a first fastener securable through said aperture and a second fastener securable through said bore.

* * * * *